Feb. 5, 1952 H. J. McINTOSH 2,584,484
SPRAYER
Filed July 2, 1948 4 Sheets-Sheet 1

Inventor
Harold J. McIntosh

By Clarence A. O'Brien
and Harvey B. Jacobson
Attorneys

Feb. 5, 1952 H. J. McINTOSH 2,584,484
SPRAYER

Filed July 2, 1948 4 Sheets-Sheet 3

Inventor

Harold J. McIntosh

By *Clarence A. O'Brien
and Harvey B. Jacobson*
Attorneys

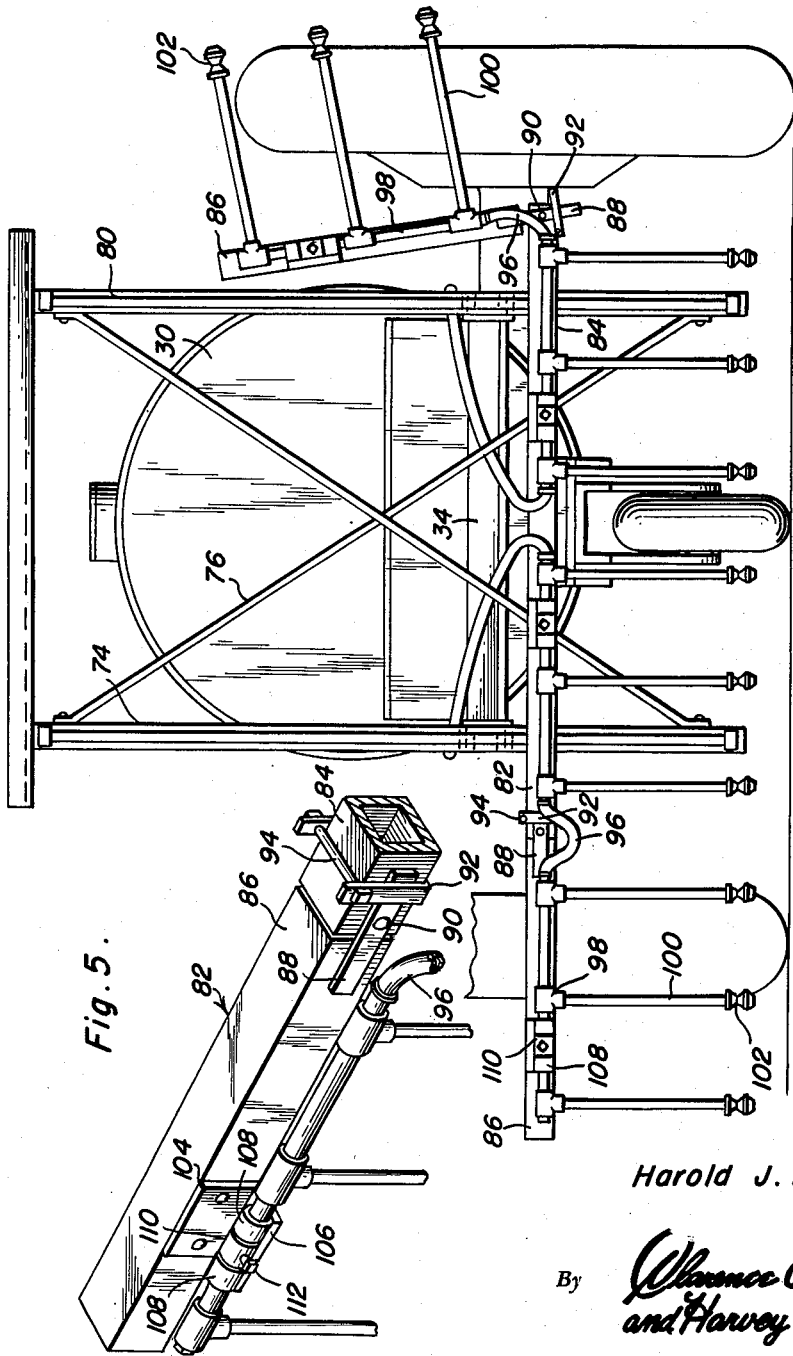

Patented Feb. 5, 1952

2,584,484

UNITED STATES PATENT OFFICE 2,584,484

SPRAYER

Harold J. McIntosh, Pender, Nebr., assignor to Automatic Equipment Manufacturing Company, Pender, Nebr., a corporation of Nebraska Application July 2, 1948, Serial No. 36,647

2 Claims. (Cl. 299—41)

This invention relates, in general, to a class of insecticides and weed-spraying equipment and pertains particularly to a tractor-mounted rear-power-take-off operated single wheel all-purpose sprayer.

The primary object of this invention is to provide a means for rigidly mounting a turbine type or other suitable pump to the prime mover in such a way that the pump can be operated by means of a V-belt or other suitable flexible connector from the rear-power-take-off or belt pulley of the prime mover.

Another important object of this invention is to provide a flexible means of transporting the necessary fluid reservoir.

Still another important object of this invention is to provide a means of adjusting the height of the sprayer boom for various different functions and to provide a boom in which the boom drops will swing back when they accidentally strike an object.

Yet another object of this invention is to provide a sprayer attachment for tractors which, while in use, can be utilized for simultaneously spraying both sides of several rows of vegetation.

Yet another object of this invention is to provide a spraying attachment having the spraying nozzles and conduits so supported on a boom as to permit convenient up and down adjustments thereon to adapt them to the plants to be sprayed.

A still further object of this invention is to combine with the spraying elements a tank or reservoir for holding the spray, this being in communication with the spraying heads or nozzles through valve means under constant control of the driver.

A still further object of this invention is to provide spraying equipment of the above character which may be conveniently mounted upon a tractor so that the pump may be effectively driven from the power-take-off or belt pulley of the tractor and so that the weight of the equipment is properly distributed with respect to the tractor for safety and compactness.

Yet another object of this invention is to provide a novel spraying device which is pivotally and adjustably mounted upon a tractor and which is provided with a boom for carrying the spraying conduits and spraying nozzles, which boom is vertically adjustable with relation to the tractor, and which spraying conduits include vertically pivotal sections and which are themselves adjustably rotatable upon the boom so that insecticides, weed sprays, stimulants and the like, may be effectively sprayed virtually in any and all directions on plants and other objects. The automatic adjustable sprayer of the instant invention may in part be additionally employed for washing purposes, to irrigate the lawn and garden, to pump water, to flush barns, to fight fire, and spray livestock with insecticides.

Yet another object of this invention is to provide a spraying device to be mounted on a conventional tractor having a novel arrangement of valve conduits interconnecting the pump, the reservoir, and the sprayers whereby spraying fluid or water may be effectively withdrawn from a well or storage tank and let into the reservoir to be eventually withdrawn therefrom and effectively pumped and distributed to the sprayers when desired.

These, together with various ancillary features and objects of the invention will become apparent to those skilled in the art, in following the description of a preferred form of the invention, illustrated in the accompanying drawings, wherein:

Figure 4 is an end elevational view of the sprayer looking from the rear; and

Figure 5 is a fragmentary perspective view of a portion of the boom at the left-hand side of Figure 4 and illustrating a vertically pivoted section thereon and an associated spraying hose section.

Like characters of reference are employed to designate like parts in the specification and throughout the several views.

Figure 1:
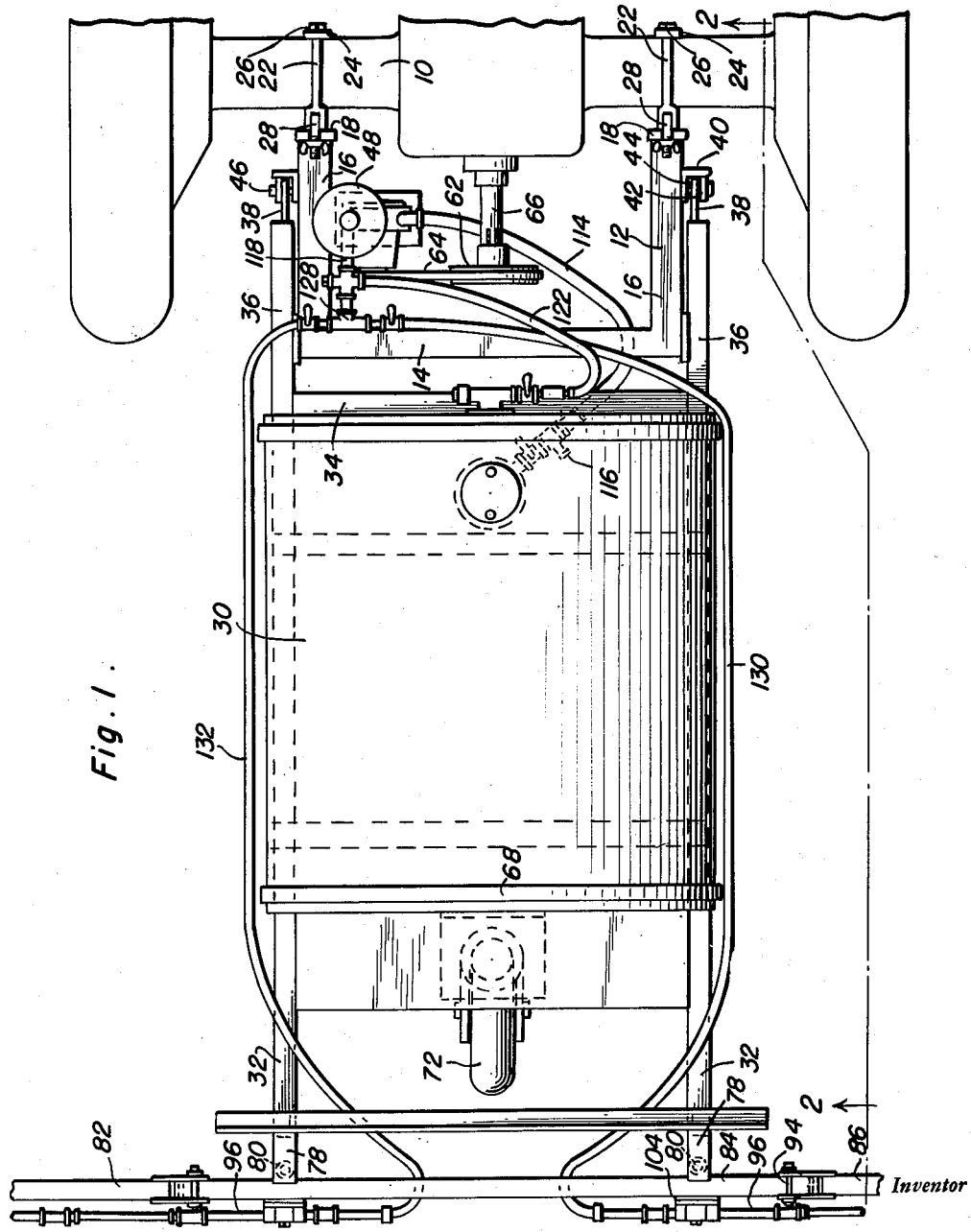
Figure 1 is a bottom plan view of the sprayer mounted on a tractor.
Figure 2:
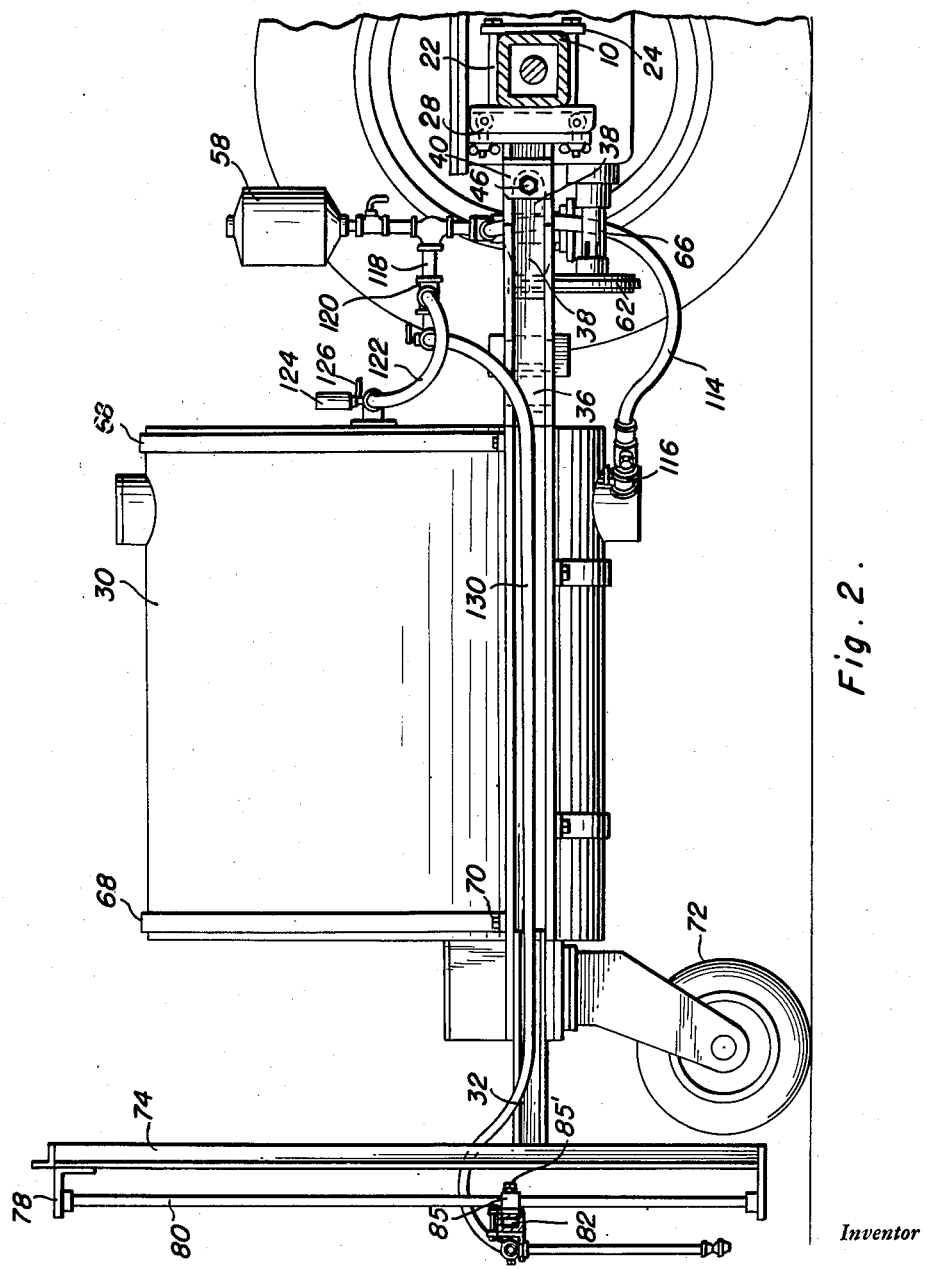
Figure 2 is a longitudinal sectional view, some parts being shown in elevation, taken substantially on the plane of section line 2—2 of Figure 1.
Figure 3:
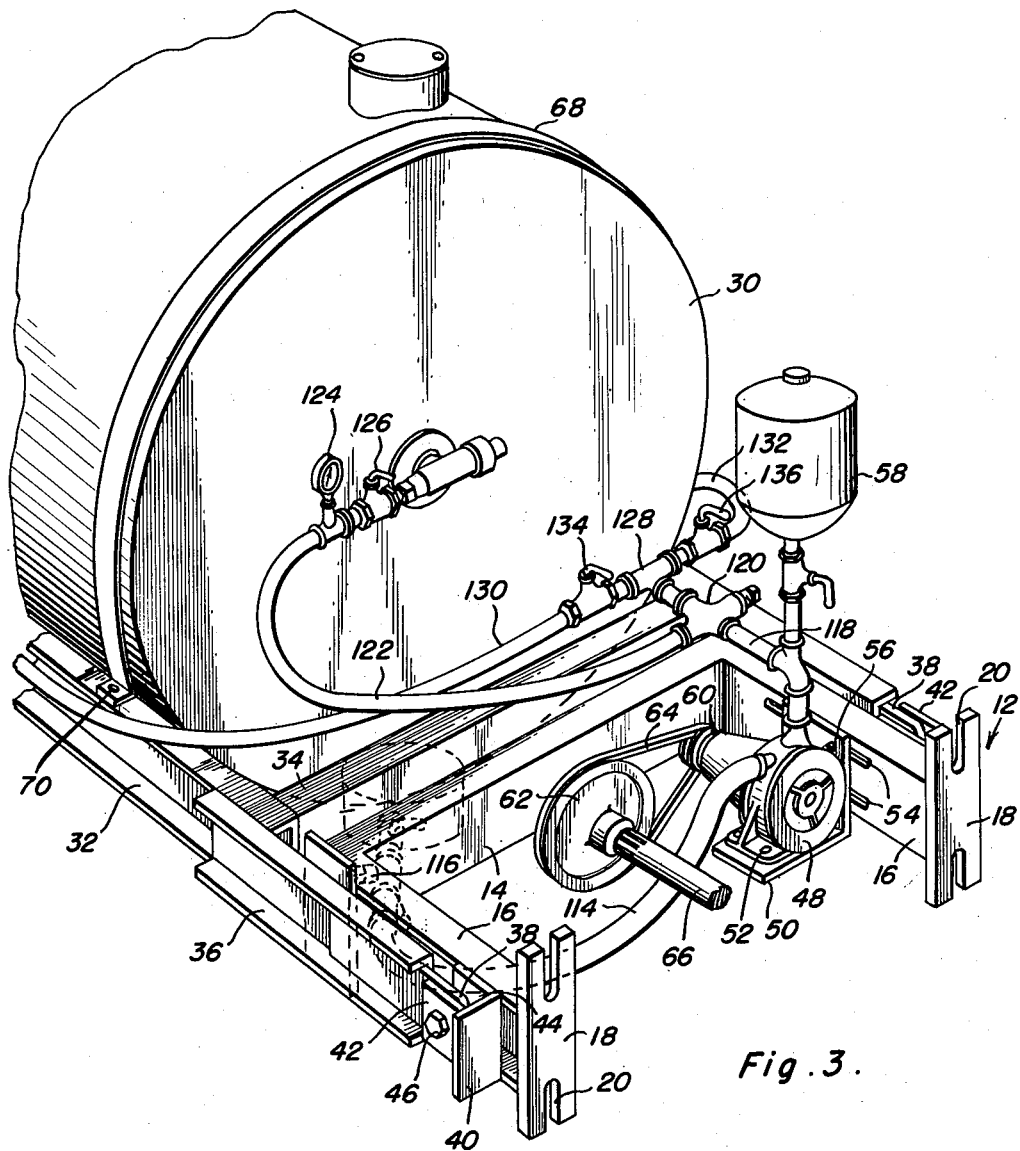
Figure 3 is a fragmentary perspective view of the forward end of the sprayer shown disconnected from the tractor.

Referring now to the accompanying drawings in detail, indicated generally at 10 is the rear wheel supporting axle of a tractor upon which is pivotally mounted the spraying device of the instant invention. The mounting is accomplished in the following fashion: A first frame 12, preferably U-shaped, is provided having a rear member 14 and a pair of side members 16, the free extremities of which carry integral vertical plates 18 having top and bottom U-shaped slots 20. A pair of C-shaped clamps 22 are positioned at suitable places on the axle 10 of the tractor or trailer, the legs of which clamp are screw-threaded at their extremities to receive apertured bars 24 and appropriate internally threaded nuts 26 for securing said clamps to the axle. The web portions of the clamps are preferably provided with lugs at their top and bottom extremities to which lugs are hingedly secured a pair of bolts 28 with wing nuts. To secure the first frame to the axle, the vertical plates 18 are caused to abut the web portion of the clamps 22, whereupon the bolts 28 with wing nuts are moved in position to engage the U-shaped slots 20, as shown more clearly in Figures 1 and 2.

A second frame for supporting the reservoir 30 is pivotally mounted on the first frame 12 in the following manner. This second frame consists generally of a pair of side members 32, preferably constructed of channels, and a pair of conventional cross braces 34. The front end of the side members 32 are provided with additional integral extensions 36 to the free ends of which are rigidly secured a pair of apertured lugs 38.

To the outer surfaces of the side members 16 of the first frame 12 and adjacent the vertical plates 18 are secured a pair of generally L-shaped brackets 40 to which are secured a pair of vertical apertured plates 42 forming a channel 44 in which the lugs 38 are slid. A pair of suitable screw-threaded bolts 46 extend through the vertical plate 42 and the lugs 38 constituting a pivotal connection between the first frame and the second frame.

A conventional pump 48 is slidably and adjustably mounted upon the first frame in the following manner. A substantially L-shaped bracket 50 is provided to which the pump is secured by means of suitable bolts 52. These bolts engage the bottom member of the bracket 50, preferably through transverse slots (not shown) to permit transverse or lateral adjustment of the pump on the bracket. One of the side members 16 of the first frame is provided with a pair of spaced longitudinal slots 54 through which extend suitable bolts 56 which engageably receive the side member of the bracket 50 to provide a means for longitudinally adjusting the brackets and pumps of the first frame.

The pump, if it is not self-priming, is provided with a conventional primer can 58 and a driven shaft to which is secured a conventional pulley 60 which engages a second pulley 62 by means of an endless web or V-belt 64. The pulley 62 is made to engage the tractor or trailer power take-off 66.

It should be mentioned at this point that the reservoir 30 may be additionally supported on the second frame by means of conventional straps 68 which envelop the surface of the reservoir and which are secured by suitable bolts 70 to the side members 32 of the second frame. To the rear of the reservoir and resiliently mounted on the second frame, a conventional caster type wheel 72 is provided. To the rear ends of the side members 32 of the second frame are suitably secured a pair of vertical brace members 74 interconnected, for better support, by means of diagonal cross braces 76. The top and bottom of each of the vertical braces 74 are provided with angles 78 for supporting a pair of vertical guide rails 80. A boom 82, in the form preferably of a substantially oblong block, is vertically adjustable upon the guide rails 80 by means of a pair of conventional clamps 85 having set screws 85'.

The boom is constructed of sections 84 and 86 in such manner as to permit vertical pivotal movement of one section with relation to the other. This pivotal connection is accomplished in the following manner. A horizontal bar 88 is rigidly attached to one of the sections 84 at one extremity and at the other extremity is provided with an aperture for retaining a pivot pin 90 which extends into the other section 86 of the boom. A suitable U-shaped clamp 92 is welded to the horizontal bars 88 and serves to prevent section 84 from dropping and holds the sections 84 and 86 in proper alignment. A suitable bolt 94 extends across the top surface of the boom and engages the apertured free extremities of the upstanding arms of the clamp member 92. This bolt 94 must be removed when it is desired to pivot section 86 vertically relative to section 84 such as is necessary for the transport or roadable position. A sprayer conduit 96 is provided, preferably in the form of a flexible hose, which communicates by means of suitable conventional couples 98 with a plurality of sprayers 100 carrying conventional sprayer heads 102. The sprayer conduit and associated sprayers are rotatably and adjustably positioned on the boom 82 in the following novel manner. A plurality of substantially L-shaped apertured brackets 104 are bolted to the boom 82 at various desired positions. To the bottom horizontal leg 106 of the brackets 104 is secured by means of welding or riveting a pair of spaced knuckles 108 in which is journalled the sprayer conduit 96. Intermediate the knuckles 108 on each bracket a clamp 110 is provided which carries a set screw 112 for securing said clamp to the sprayer conduit 96. The set screw 112 is made to extend somewhat beyond the edge of the bottom leg 106 of the bracket 104 so that when the sprayer conduit and sprayer are rotated downwardly the set screw will abut the leg 106 and prevent further rotation of the sprayer conduit and sprayer thereon. Should the sprayers accidentally strike the ground, they will be automatically rotated upwardly, thus preventing any damage to the sprayers themselves.

Interconnecting the reservoir 30 and the pump 48 is a pump inlet conduit 114 having a branch 116 to which may be secured a pipe or hose which can be led into a well or a spraying liquid storage tank for drawing water or liquid into the reservoir. The pump is further connected to a pump outlet conduit 118. A fitting 120 having at least three passages, and preferably in the form of a three or four-way pipe couple, is secured through one of its passages to the conduit 118. Through another passageway in the couple 120, a reservoir return conduit 122 is provided having a conventional pressure gage 124 and a valve 126. This valve 126 is opened when the operator desires to fill the reservoir with spraying liquid or water which is drawn into the reservoir via the branch conduit 116. When it is desired to withdraw spraying liquid or water from the reservoir to be conducted to the sprayers, the valve 126 is partially closed until the desired spraying pressure registers on the gage. The excess liquid is allowed to by-pass through valve 126 and provides agitation of the insecticide or herbicide spray liquid.

Communicating with the first passageway of the couple 120 is a liquid spray delivery conduit 128 having branches 130 and 132, respectively, each branch being provided with a suitable valve 134 and 136 for selectively opening and closing either of the conduits.

In practical operation, the pump 48 is longitudinally adjusted on the first frame so that the pulley 62 can be made to engage the power take-off 66 of the tractor. By attaching a hose to the branch inlet 116, which hose is led into a spraying liquid storage compartment or well, the pump will draw this spraying liquid through the conduits 114, then through the conduit 122 and finally into the reservoir 30. In this phase of the operation, the valve 126 is opened while the valves 134 and 136 remain closed. After sufficient liquid is stored in the reservoir 30, the branch conduit 116 is closed off. When it is desired to withdraw spraying liquid or water from the reservoir to be conducted to the sprayers, the valve 126 is partially closed until the desired spraying pressure registers on the gage. The excess liquid is allowed to by-pass through valve 126 and provides agitation of the insecticide or herbicide spray liquid. A spraying liquid will thereafter be pumped from the reservoir through the conduit 114, thence through the couple 120 and into the branches 130 and 132, either together or selectively, and eventually to the spraying conduit 98 and the sprayers 100. As previously described, the boom which retains the spraying conduit 96 and the associated sprayers 100 can be vertically adjusted and retained at any desired height. By providing a sectional boom, certain sections of the spraying conduit 98 and associated sprayers 100 may be vertically pivoted into any desired angulated position, as shown in Figure 4. And, lastly, the spraying conduit 98 and associated sprayers 100 may be rotated about the boom 82. Thus, an extremely effective spraying device is provided which is pivotally and resiliently mounted on a tractor or trailer, which is operated by means of a pump driven by the power take-off of the tractor and which is provided with sprayers which can be adjusted in virtually any and all positions for the effective delivery of desired spraying liquids.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An adjustable sprayer for use with a trailer comprising a boom, means for adjustably securing said boom on the trailer, spray nozzles interconnected by a flexible fluid conveying conduit, and means for mounting said conduit on said boom for vertical pivotal movement, said mounting means including a plurality of substantially L-shaped brackets secured to said boom, a pair of spaced knuckles secured to each horizontal leg of said brackets, a clamp carried on each horizontal leg intermediate said knuckles, said conduit being journaled in and extending through said knuckles and clamp, and means for securing said clamp to said conduit and for preventing downward pivotal movement of said conduit beyond a predetermined position.

2. The combination of claim 1 wherein said means for securing said clamp to said conduit includes a set screw threaded through said clamp and extending after engagement with said conduit beyond the free edge of said horizontal leg and adapted to abut the latter after a predetermined downward movement of said conduit.

HAROLD J. McINTOSH.

REFERENCES CITED

The following references are of record in the file of this patent:

UNITED STATES PATENTS

| Number | Name | Date |
|---|---|---|
| 1,043,929 | Heard | Nov. 12, 1912 |
| 1,118,091 | Willis et al. | Nov. 24, 1914 |
| 1,583,619 | Splittstoser | May 4, 1926 |
| 1,886,369 | Bogart | Nov. 8, 1932 |
| 2,022,387 | Reid | Nov. 26, 1935 |
| 2,111,439 | Squyars | Mar. 15, 1938 |
| 2,252,872 | Spreng | Aug. 19, 1941 |
| 2,275,302 | Magnuson | Mar. 3, 1942 |
| 2,305,913 | Troyer | Dec. 22, 1942 |
| 2,381,649 | Dalton | Aug. 7, 1945 |
| 2,429,492 | Scranton | Oct. 21, 1947 |